United States Patent [19]
Fujiwara

[11] 3,985,296
[45] Oct. 12, 1976

[54] STEAM TRAP WITH BIMETAL VALVE CONTROL

[76] Inventor: Katsuji Fujiwara, Hiraoka 191, Nishitani, Kakogawa, Hyogo, Japan

[22] Filed: Apr. 10, 1975

[21] Appl. No.: 566,715

[30] Foreign Application Priority Data
Aug. 29, 1974 Japan .............................. 49-99267

[52] U.S. Cl. .............................. 236/59; 236/101 B
[51] Int. Cl.² .......................................... F16T 1/04
[58] Field of Search .............. 236/101, 59, 87, 66, 236/33; 337/335; 60/529

[56] References Cited
UNITED STATES PATENTS

| | | | |
|---|---|---|---|
| 3,044,295 | 7/1962 | Shivers | 337/335 X |
| 3,220,650 | 11/1965 | Deeks | 236/59 |
| 3,362,636 | 1/1968 | Miyawaki | 236/59 |

*Primary Examiner*—William E. Wayner
*Attorney, Agent, or Firm*—Toren, McGeady and Stanger

[57] ABSTRACT

The valve of a steam trap is opened and closed by operation of a temperature sensitive bimetallic assembly having a stacked configuration with individual bimetallic members of the stacked assembly moving between a first and a second position in response to temperatures within the steam trap. The bimetallic members are arranged to vary the length of the bimetallic stacked assembly to open and close the valve of the steam trap, with the length of the stack being, preferably, diminished in response to a higher level of temperature.

11 Claims, 1 Drawing Figure

U.S. Patent    Oct. 12, 1976    3,985,296
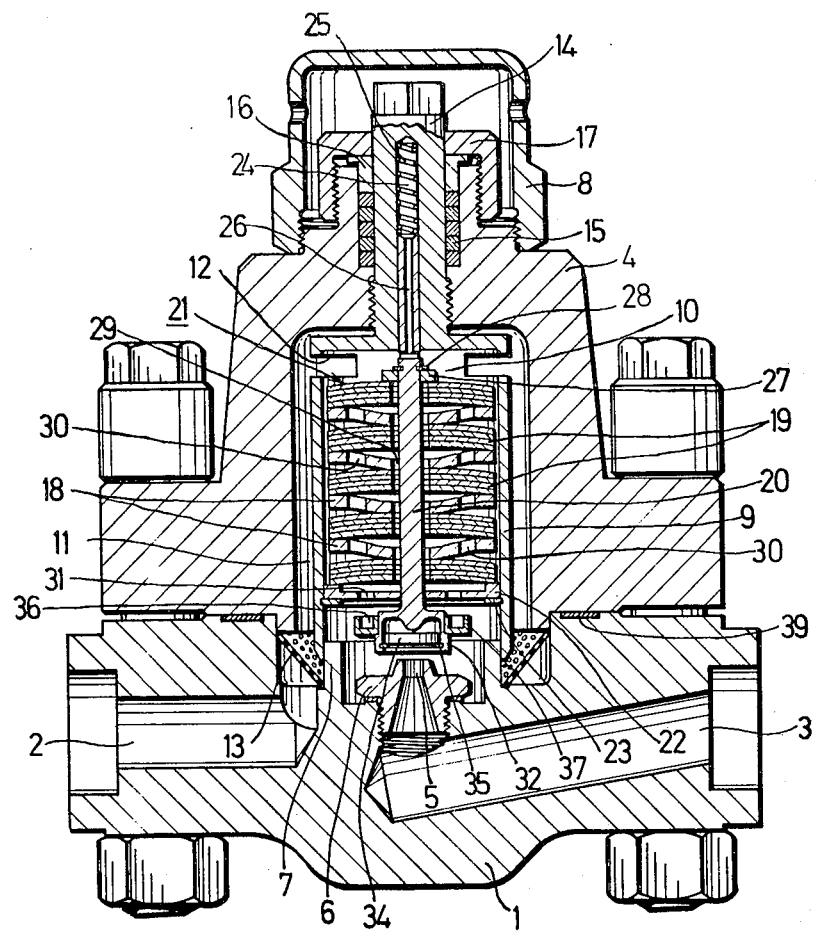

STEAM TRAP WITH BIMETAL VALVE CONTROL

BACKGROUND OF THE INVENTION

The present invention relates generally to the construction of a steam trap operative to discharge condensate, and more particularly, to a steam trap having a valve which is opened and closed by the bending action of a stack of bimetallic plates occurring as a result of temperature variation.

Bimetallic valve control elements normally involve a pair of metallic plates having different coefficients of thermal expansion which will bend as a result of variation in temperatures. Such bimetallic control plates may exhibit disadvantages due to slow rates of bending variation and low sensitivity to temperature change. Furthermore, bimetallic control devices may be difficult to support within a steam trap inasmuch as large external forces may cause damage thereto.

In conventional valve controls, a plurality of bimetallic plates may be arranged in such a manner that the variation in bending of all of the plates may be cumulatively applied in order to supplement a smaller or slower rate of bending variation in each of the individual bimetallic plates. In such an assembly, larger external forces involved in controlling the opening and closing of a valve may be better supported.

Nevertheless, in such bimetallic valve control devices utilizing plural discs of bimetallic plates stacked in layers, it is still difficult to avoid problems because of the fact that such control members are subjected to forces arising upon opening and closing of a valve member and also fluid pressure forces acting thereon as well as other elastic forces.

Thus, bimetallic control devices are always subjected to large external forces and, additionally, are exposed to ambient fluid pressures and temperatures which are rather high and which may adversely effect performance of the control. Therefore, the performance of bimetallic control devices may easily change and deteriorate because of electro-chemical erosion of the parts or because of cracking due to stress. Thus, the problem arises in that the steam trap involving bimetallic valve controls may not exhibit a uniform performance characteristic over an extended period of time but may require frequent adjustment. Furthermore, the operative life of such steam traps may be significantly shortened due to malfunction of the bimetallic valve controls.

The present invention is intended to overcome the aforementioned disadvantages of steam traps having bimetallic valve controls and to provide a bimetallically controlled steam trap which operates to apply larger forces to open and close the valve of the steam trap, thereby providing firmer more secure valve operation. Additionally, the present invention aims for providing bimetallic valve control means having superior durability and more uniform operating performance over a longer period of time. Additionally, with the arrangement of the present invention, a greater reliability in operation may be achieved.

SUMMARY OF THE INVENTION

Briefly, the present invention may be described as relating to a steam trap having a fluid inlet port, a fluid outlet port, valve means for controlling fluid flow through the steam trap from said inlet port to said outlet port and a bimetallic assembly responsive to temperature variations for controlling the operation of the valve means of the steam trap.

The bimetallic assembly of the invention comprises a plurality of bimetallic members having insert means separating each of the bimetallic members from a next adjacent bimetallic member. The bimetallic control assembly is configured as an elongated stack with the bimetallic members arranged to vary the length of the stack by temperature responsive movement. Each of the bimetallic members operate to assume a first position when a first higher temperature is senses and a second position when a lower temperature is sensed. The bimetallic members and the inserts are arranged to effect variation in the stack length when the bimetallic members move between said first and said second positions. Means are provided for interconnecting the bimetallic assembly with the valve means of the steam trap thereby to effect opening and closing of the valve means in response to movement of the bimetallic members between said first and second positions. Thus, as particular temperature levels are reached, the length of the stack of bimetallic members varies for given temperatures thereby actuating the valve means to open and close the fluid flow path through the steam trap.

More particularly, the present invention is arranged so that the stack length of the assembly contracts or decreases when a higher control temperature is sensed. Thus, the length of the bimetallic stack assembly varies inversely with variations in temperature.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

The single FIGURE of drawing is a cross-sectional view of a bimetallically controlled steam trap in accordance with the present invention showing the trap in its opened position.

DETAILED DESCRIPTION OF THE PREFERRED EMBODIMENT

Referring to the drawing, the preferred embodiment of the present invention is shown as comprising a main body or housing 1 having an inlet port 2, an outlet port 3, and a cover member 4. A bimetallically controlled valve assembly for opening and closing a flow passage between the inlet port 2 and the outlet port 3 comprises a valve seat 6 having a valve port 5 defined therein. An annular projection 7 encircles the valve seat 6.

A cylindrical member 9 is slidably fitted about the projection 7 and a valve chamber defined within the housing 1 is divided by the cylindrical member 9 into a bimetal chamber 10 and an outer chamber 11. Through holes 12 are bored through the upper portion of the cylinder 9 in order to communicate the chamber 10 with the chamber 11. The chamber 11 is in flow communication with the inlet port 2 through a screen 13 interposed therebetween.

The cylinder 9 is integrally formed with a regulating stem 14 at its upper end. Packings 15 maintain the regulating stem 14 in air-tight sealed engagement with the cover 4. An interposed packing member presses the packing 15 downwardly against the cover 4 by operation of a cap nut 17 threadedly engaged with the cover 4. An outer cap member 8 is threadedly engaged with the cover 4 at the top of the assembly and is removable to permit access to the regulating stem 14.

Valve opening and closing is controlled by a bimetallic assembly 21 which is arranged within the bimetallic chamber 10. The assembly 21 comprises a plurality of annularly shaped curved inserts 18 interposed between adjacent bimetallic members 19. The bimetallic members 19 also comprise a generally curved annular configuration and, together with the inserts 18, are arranged in a stack configuration to form the bimetallic assembly 21 as an elongated stack.

It will be seen that each of the bimetallic members 19 comprises a plurality of plates and is formed with a curvature which, as shown in the drawing, is generally concave on its lower side and convex on its upper side. The inserts 18 also comprise a generally curved configuration configured to separate adjacent bimetallic members 19.

A valve stem 20 is arranged to extend through a central longitudinal opening formed in the bimetallic assembly 21 by internal openings formed in each of the bimetallic members 19 and inserts 18. A connecting plate 27 and a snap ring 28 mount the inserts 18 and the bimetallic members 19 upon the valve stem 20.

The upper side of each bimetallic member 19 has a coefficient of thermal expansion which is larger than the coefficient of thermal expansion of the lower side thereof. Thus, the bimetallic members 19 will assume a first position when exposed to a predetermined higher temperature and a second position when exposed to a predetermined lower temperature. As depicted in the drawing, the bimetallic members 19 are exposed to a lower temperature and therefore assume the position depicted. In this position, the lower side of the bimetallic members 19 is generally concave in configuration and the upper side thereof is generally convex. However, when exposed to a high temperature, the bimetallic members 19 will tend to bend to reverse the curvature of their sides. Thus, at a higher temperature the upper side of each bimetallic member 19 will assume a generally concave shape while the lower side assumes a generally convex shape. With the bimetallic members 19 exposed to the lower temperature, i.e., in their second assumed position, the general shape or configuration of the bimetallic members 19 will approximately coincide in curvature with the shape of adjacent inserts 18. Each of the bimetallic members 19 are arranged and configured to bend in the same direction in response to temperature variation.

The bimetallic assembly 21 is supported within the cylinder 9 by a support plate 22 which is held in place by a snap ring 23.

The upper end of the valve stem 20 is fitted within an internal bore 24 of the regulating stem 14 to be slidably guided therein. The lower end of the stem 20 penetrates the central hole of the support plate 22 and is also slidably guided therein. A spring 25 positioned within the bore 24 of the stem 14 urges the valve stem 20 downwardly toward the valve seat 6. The bore 24 is in communication with the bimetal chamber 10 through a passageway 26.

Between the outer periphery of the valve stem 20 and the central opening of the bimetallic members 19 and the inserts 18, there is provided a clearance 29. The clearance 29, together with holes 30 bored through the inserts 18 and through holes 31 bored through the support plate 22, forms a flow passage which extends through the bimetallic assembly 21.

A valve receiving portion 32 is formed at the lower end of the valve stem 20 to accommodate a valve disc 34 in a free state. The valve disc 34 is held in place within the valve receiving portion 32 by a snap ring 35. A reaction plate 37, which includes an annular groove 36 facing in the direction of the through holes 31, is mounted about the valve receiving portion 32. A gasket 39 is provided between the cover 4 and the housing 1.

In the operation of the steam trap of the present invention, when fluid contained in the valve chamber 11 is at a predetermined lower temperature, such as is the case when condensate is accumulated therein, the bimetallic members 19 assume the shape illustrated in the drawing thus lifting the valve stem upwardly and thereby lifting the valve disc 34 off the valve seat 6 to open the valve port 5. With the valve in this condition, condensate is discharged to the exhaust port 3 through the valve port 5.

After the discharge of the condensate, steam will flow into the valve chamber 11 thereby elevating the temperature within the bimetallic chamber 10. When the bimetallic members 19 are heated to a higher predetermined temperature, the increased temperature will cause the bimetallic members 19 to bend to reverse the curvature thereof. Thus, the bimetallic members 19, when exposed to the higher predetermined temperature, will have their upper sides generally concave and their lower sides generally convex, thereby approximately coinciding in configuration or curvature with the inserts 18. As a result, the overall length of the bimetallic stack assembly 21 will contract or be diminished and the valve stem 20 will be lowered to bring the valve disc 13 into contact with the valve seat 6 to close the valve port 5.

With this valve closing operation, the interior of the bore 24 in the regulating stem 14 is at the same pressure as the bimetallic chamber 10 through the passage 26 and the valve stem 20 is urged by the spring 25 in the closing direction. Thus, fluid to be discharged flows around the bimetallic members 18 and impinges downwardly upon the reaction plate 37. As a result, the valve disc 34 will be seated very firmly and securely against the valve seat 6.

Once the valve disc 34 is seated, it is pressed more tightly onto the valve seat 6 by fluid pressure and as a result, the valve is maintained securely closed.

Since the valve disc 34 is loosely fitted onto the valve stem 20, an improved seating effect may be achieved despite the fact that the bimetallic members 19 and the inserts 18 may be more or less in an inclined position.

Once again, condensate will flow into the valve chamber and accumulate therein. Thus the temperature will decrease and the bimetallic members 19 will resume their former shapes as illustrated in the drawing. Therefore, the valve stem 20 and the valve disc 34 will be lifted against the external force, i.e., fluid pressure acting on the valve disc 34, and the valve port 5 will be opened to discharge condensate.

The present invention includes means for regulating the opening and closing operation of the valve. In such a case, the regulating stem 14 is rotated by a spanar or a similar device to threadedly raise or lower the cylinder 9. To effect the fluid discharge at a higher temperature, the cylinder 9 is moved upwardly. To effect similar discharge at a lower temperature, the cylinder is moved downwardly.

The inserts 18 are, in the preferred embodiment, interposed between every tier of adjacent bimetallic members 19. Furthermore, it is preferable if each of the bimetallic members 19 are composed of four bimetallic disc members. However, the number of bimetallic members 19 between adjacent inserts 18 may be increased or decreased depending upon the opening force required and depending upon use at higher pressures.

With the bimetallic steam trap of the present invention, the bimetallic members are pressed by the external force only at the instant of opening and in other opened and closed positions no excessive force is applied thereto. Therefore, electrochemical erosion and stress erosion cracks are less likely to occur in the bimetallic members and there is little change in the performance characteristics thereof. Furthermore, the durability of the bimetallic members is significantly increased and the bending action thereof due to temperature variation becomes more sensitive.

In the arrangement of the bimetallic steam trap of the present invention, the valve stem is guided by the cylinder and the valve stem and the valve discs are loosely fitted. Thus, in the case of heat responsive deformation of the bimetallic members in an inclined condition, the valve stem will be less effected by such inclination. Even if the valve stem is slightly inclined, the valve disc will always seat securely.

The valve stem is urged by the spring member toward the valve seat and the hole bored in the regulating stem is in communication with the bimetallic chamber so that the sliding action of the valve stem may be effected quite smoothly.

The flow passage for the condensate and steam is formed within the bimetallic unit to extend therethrough so that the bending action of the bimetallic members with temperature variation becomes quite sensitive.

The condensate running through the bimetallic unit spouts downwardly from the through holes of the support plate 22 onto the reaction plate 37 provided around the valve receiving portion 32 and thereby effects displacement of the valve stem in the valve closing direction. Thus, valve closing action will be securely effected without delay.

While a specific embodiment of the invention has been shown and described in detail to illustrate the application of the inventive principles, it will be understood that the invention may be embodied otherwise without departing from such principles.

What is claimed is:

1. A steam trap including a fluid inlet port, a fluid outlet port, valve means for controlling fluid flow through said steam trap from said inlet port to said outlet port and a bimetallic assembly responsive to temperature variations for controlling opening and closing of said valve means, said bimetallic assembly comprising a plurality of bimetallic members having insert means separating each of said bimetallic members from a next adjacent bimetallic member, said bimetallic assembly being configured as an elongated stack with said bimetallic members arranged to vary the length of said stack by temperature responsive movement of each of said bimetallic members between a first position at a higher temperature and a second position at a lower temperature, said bimetallic members and said inserts being arranged to effect variation in the length of said stack when said bimetallic members move between said first and said second positions, and means interconnecting said bimetallic assembly with said valve means to open or close said valve means in response to movement of said bimetallic members between said first and said second positions, both said bimetallic members and said insert means comprising a generally annular curved configuration with said bimetallic members being configured with a convex side and a concave side and adapted to reverse said concave side and said convex side thereof when moving between said first and second positions, the curvature of said bimetallic members generally conforming to the curvature of said insert means when said bimetallic members are in one of said first and said second positions.

2. A steam trap according to claim 1, wherein the length of said bimetallic stack assembly is varied inversely relative to temperature change.

3. An assembly according to claim 1, wherein said bimetallic members and said inserts are arranged to effect a shorter stack length when said bimetallic members are in said first position and a longer stack length when said bimetallic members are in said second position.

4. A steam trap according to claim 1, wherein said valve means comprise a valve stem extending longitudinally with said bimetallic stack assembly and connected thereto by said interconnecting means to be moved therewith by movement of said bimetallic members between said first and said second position.

5. An assembly according to claim 4, wherein said bimetallic assembly comprises a longitudinal central opening and wherein said valve stem is mounted to extend through said central opening.

6. A steam trap according to claim 1 including means for adjusting the temperature responsiveness of said bimetallic assembly to enable variation of the temperatures at which said bimetallic members move to said first and said second positions.

7. A steam trap according to claim 1 including a housing, a cylindrical body having said bimetallic assembly located therein, a support plate fixed at one end of said cylindrical body to prevent displacement of said bimetallic assembly outwardly of said cylindrical body, a connecting plate affixed to said valve stem for abutment with said bimetallic assembly to urge said bimetallic assembly against said support plate, a regulating stem, spring means compressively engaged between said regulating stem and said valve stem, and means adjustably mounting said regulating stem on said housing to enable variation of the position of said cylindrical member thereby to adjust the temperatures at which said valve means open and close.

8. A steam trap according to claim 7, wherein said spring means urge said valve stem in the direction of closing of said valve means.

9. A steam trap according to claim 7, wherein said longitudinal central opening of said bimetallic assembly is sized to define a clearance space between said valve stem and said bimetallic assembly, and wherein said insert means are configured to define bore holes extending therethrough, said clearance space and said bore holes being arranged to define a fluid flow passage through said bimetallic assembly.

10. A steam trap according to claim 9, wherein said steam trap is configured to define a fluid flow path between said inlet port and said outlet port which includes said fluid flow passage extending through said bimetallic assembly.

11. A steam trap according to claim 10, including a reaction plate attached to said valve stem and located to have fluid flow through said fluid flow passage impinge thereagainst in a direction to apply thereto a force tending to move said valve stem toward closing of said valve means.

* * * * *